A. E. CRITTENDEN.
HORSE-BLANKET.
No. 177,809.  Patented May 23, 1876.
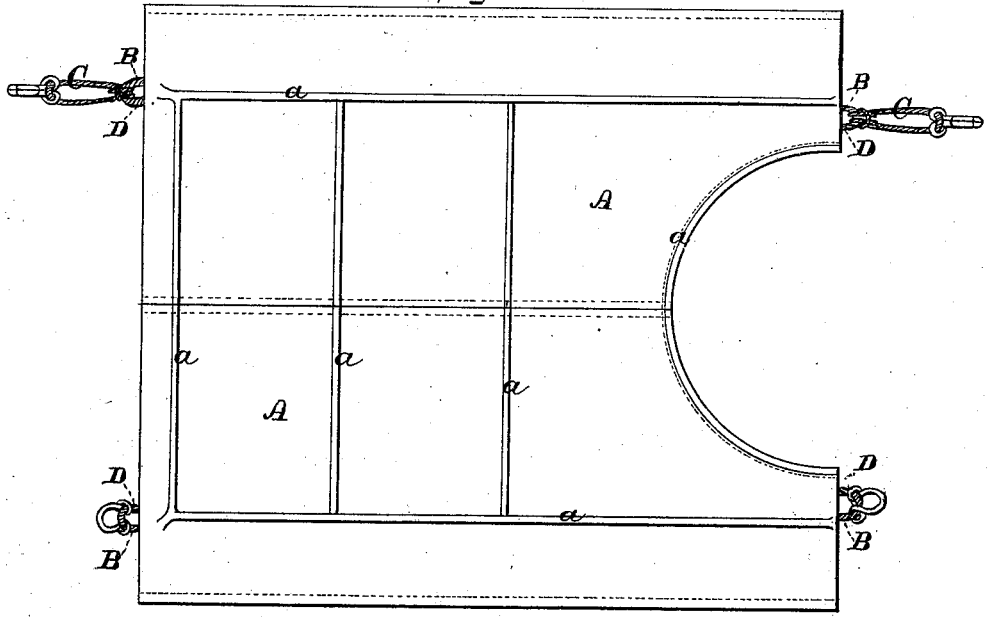
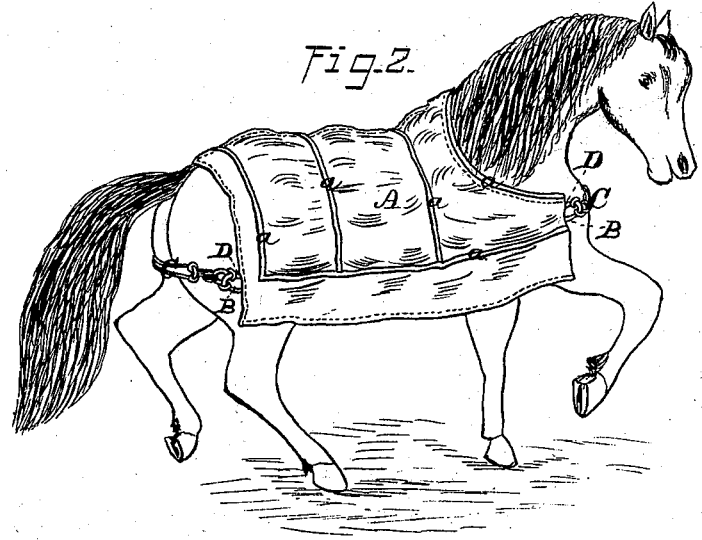

UNITED STATES PATENT OFFICE.

ALVAH E. CRITTENDEN, OF CANASERAGA, NEW YORK.

IMPROVEMENT IN HORSE-BLANKETS.

Specification forming part of Letters Patent No. 177,809, dated May 23, 1876; application filed April 24, 1876.

*To all whom it may concern:*

Be it known that I, A. E. CRITTENDEN, of Canaseraga, in the county of Allegany and in the State of New York, have invented certain new and useful Improvements in Blanket-Fastenings; and do hereby declare that the following is a full, clear, and exact description thereof, reference being had to the accompanying drawing, making a part of this specification, in which—

Figure 1 is a plan view of my improved blanket, and Fig. 2 is a side elevation of the same in position upon a horse.

Letters of like name and kind refer to like parts in each of the figures.

The design of my invention is to increase the comfort and healthfulness of a horse-blanket, by enabling the same to be arranged so as to admit of a free circulation of air between said blanket and horse; and to this end it consists, principally, in a horse-blanket provided with a cord, which extends within suitable guides along each of its sides, and at its front and rear ends is connected to or with elastic straps or bands, that pass across the breast and rump of a horse and connect said cord with the cord that is within the opposite side of said blanket, substantially as and for the purpose hereinafter specified. It consists, further, in combining, with the horizontal cords named, one or more cords which are confined within suitable guides, and pass over the back or neck of the horse, substantially as and for the purpose hereinafter shown.

In the annexed drawings, A represents a horse-blanket of usual form, which is provided at each side with a cord, B, that extends horizontally from front to rear, upon a line with the breast of a horse, and is contained within a tuck, loops, or any suitable guides, *a*, that will permit said cord to move longitudinally.

When the blanket A is in position upon a horse, the ends of the cords B and B are connected together by means of two elastic bands, C and C, one of which latter crosses the breast and the other the rump of the horse.

The operation of the cords B and B and the elastic bands C and C is to confine the blanket upon the horse and prevent displacement, while in addition thereto, as said parts fit closely around the body of said horse, its motion will cause them to work slightly upward, and the upper portion of said blanket to be loosened from the back of the horse.

Within tucks or guides *a* at the front and rear ends of the blanket A, and, if desired, at suitable points between, are cords D and D, which pass over the body of the horse, and at their ends are connected with the bands C and C, or with other similar elastic attachments.

The cords D and D operate together the blanket A into a shirred form, and prevent any portion of the same from touching the back of the horse, except at the points where said cords are inserted.

A blanket thus constructed and secured upon a horse is equally effective as a protection against flies and the heat of the sun as those commonly used, while, from the free circulation of air which is permitted between its inner surface and the body of the horse, a material increase in the comfort of the animal is secured. In addition to these advantages, the blanket is more securely fastened, and its fastenings are less objectionable, than those of usual construction.

Having thus fully set forth the nature and merits of my invention, what I claim as new is—

1. In combination with the blanket A, the cords B and B, contained within tucks or guides *a* and *a* at each side of the same, and the elastic bands C and C, extending between the ends of said cords, substantially as and for the purpose specified.

2. In combination with the blanket A, provided with the side cords B and B and elastic bands C and C, the transverse cords D and D, contained within tucks or guides *a* and *a*, and at their ends connected to or with said bands, substantially as and for the purpose shown.

In testimony that I claim the foregoing I have hereunto set my hand and seal this 1st day of March, 1876.

ALVAH E. CRITTENDEN. [L. S.]

Witnesses:
FAY MILLOR,
WARREN B. WENTWORTH.